Aug. 15, 1933.    J. C. WILSON ET AL    1,922,226
ELECTRIC SHIP PROPULSION SYSTEM
Filed Jan. 12, 1931    3 Sheets-Sheet 3

WITNESSES.
E.A.M°Closkey.
P.E. Friedemann

INVENTORS.
James C. Wilson and
Herbert S. Carnegie.
BY
Wesley G. Carr
ATTORNEY

Patented Aug. 15, 1933

1,922,226

UNITED STATES PATENT OFFICE 1,922,226

ELECTRIC SHIP-PROPULSION SYSTEM

James C. Wilson, Great Haywood, and Herbert S. Carnegie, Stafford, England

Application January 12, 1931, Serial No. 508,026, and in Great Britain January 15, 1930

6 Claims. (Cl. 172—8)

The present invention relates to electric ship-propulsion systems for ships or ferries having two or more propelling means, each driven by a separate motor or group of motors.

One object of our invention is to provide for simultaneously and independently controlling the speed and direction of rotation of several motor units and for varying the electrical characteristics of the generators supplying the electric energy to the motors so that the generators operate at a substantially fixed load regardless of the variations in speed and direction of rotation of the motor units.

Figure 1:
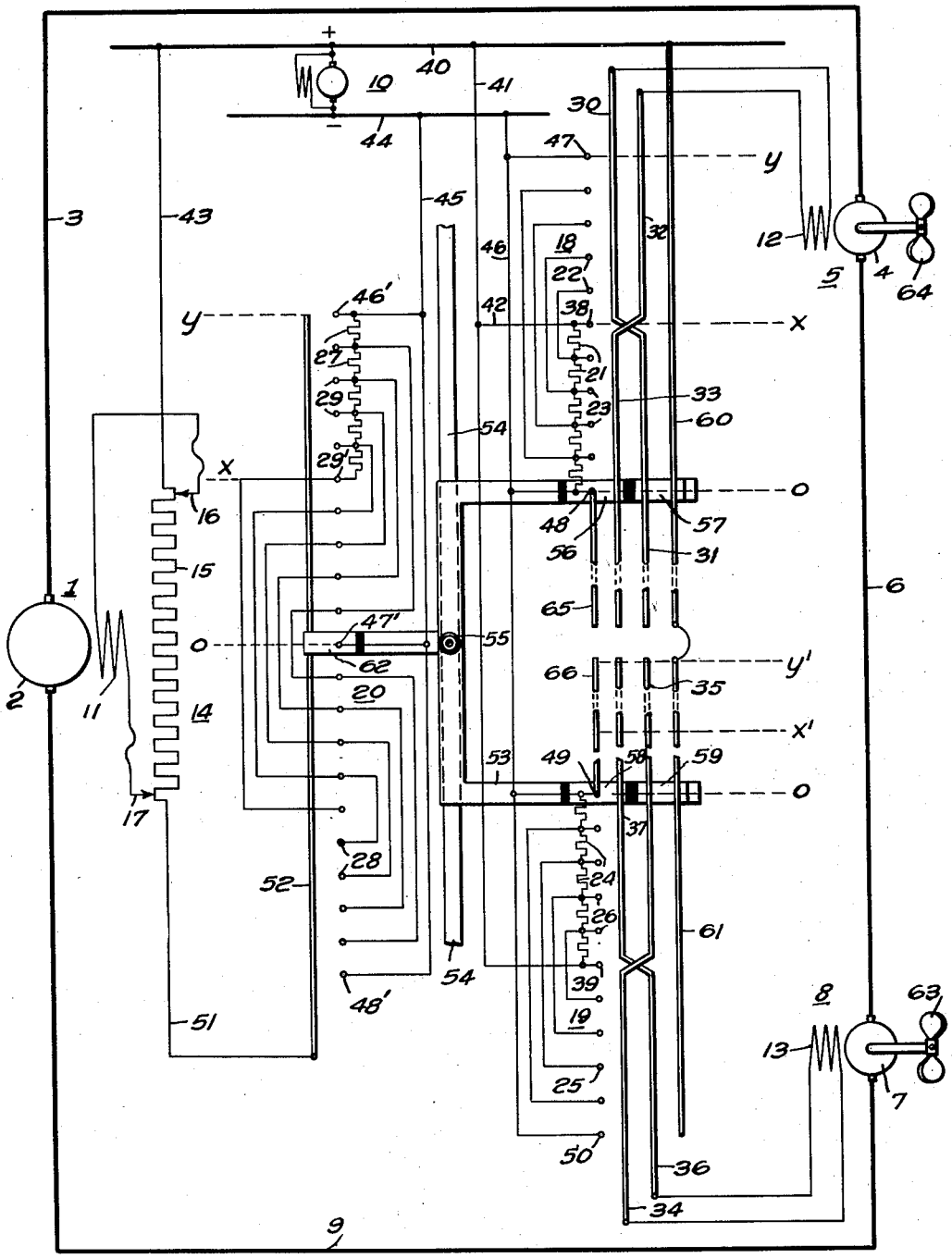
Figure 2:
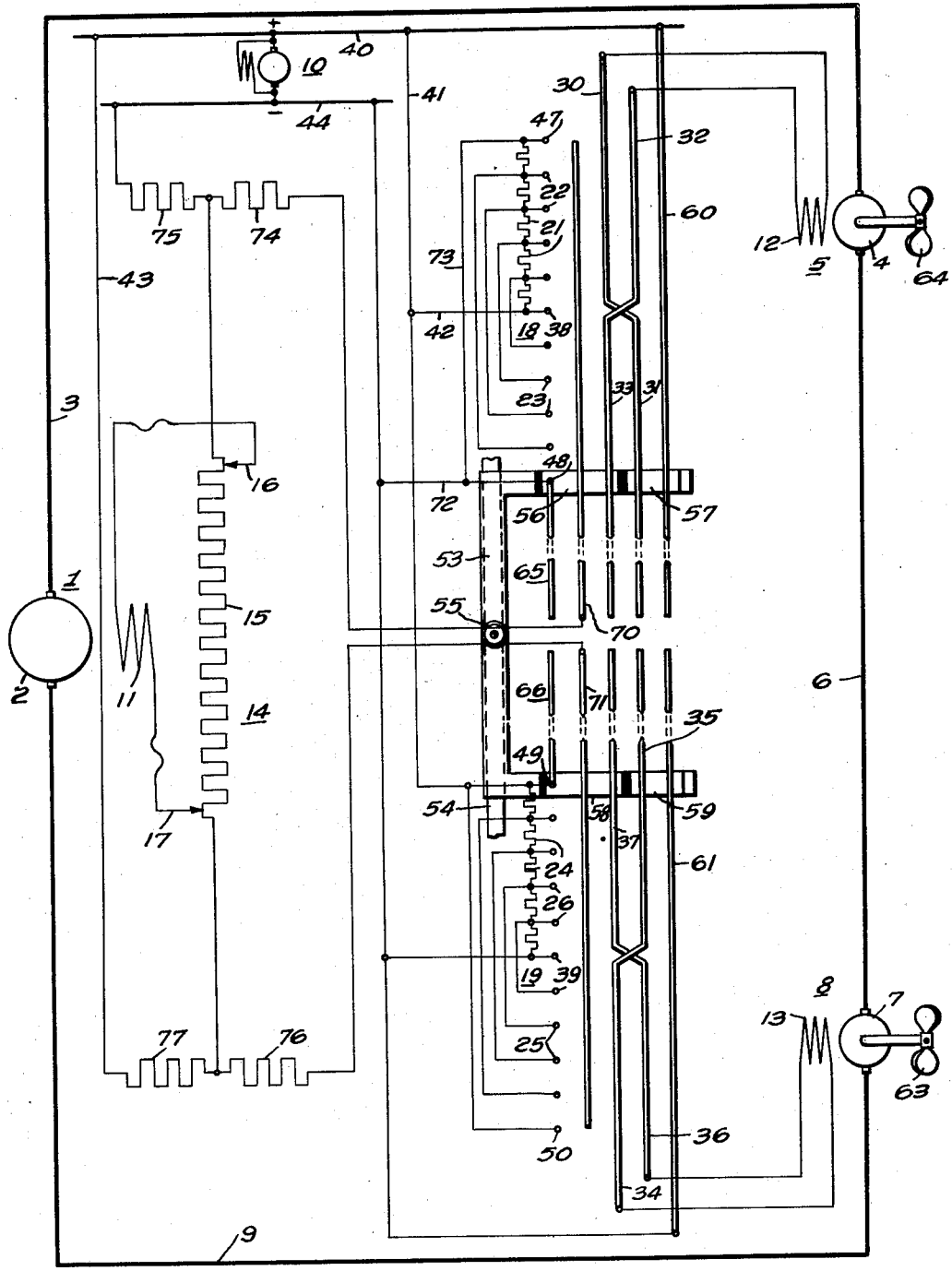
Figure 3:
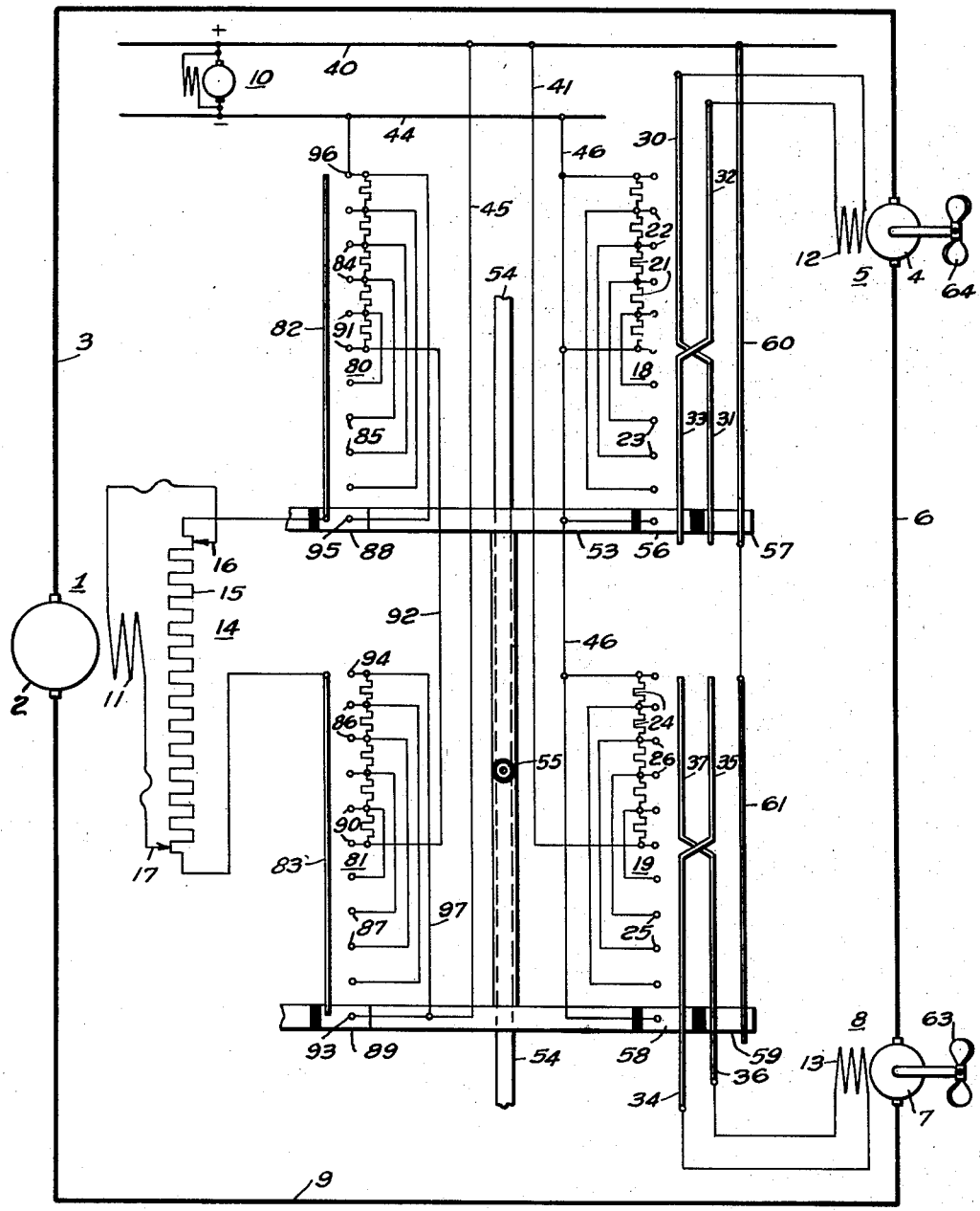

Other objects and advantages will become more apparent from a study of the following specification when taken in conjunction with the accompanying drawings, in which:

Figure 1 shows diagrammatically one modification of our electrical control system shown associated with a main generator and two propeller motors, and Figs. 2 and 3 show diagrammatically further modifications of our electrical control system shown similarly associated with a generator and a pair of motors.

The present description will be confined to a system of control for a ship or ferry having one port and one starboard propelling means, i.e., to conventional twin screw or paddle vessels. The invention is, however, equally applicable to ships provided with a larger number of propellers. For further convenience of description, the term "propeller" will be taken to include "paddle".

In practicing our invention, the armature of the motor driving one propeller is connected in series circuit relation with the armature of the motor driving the other propeller and in series circuit relation with the armature of the main generator supplying energy to the motors. The field windings of the main generator and the respective motors are separately excited. The relative speeds of the motors are then varied by simultaneously varying the field strengths of the motors and the generator in such a manner as to compensate for the change in counterelectromotive force of the motor whose field strength has been changed. In other words, generator electromotive force is kept at such a value to be equal to the combined counterelectromotive force of the motors whereby the generator or power plant is not overloaded when the field strength of either motor is weakened. It should also be observed that weakening the field strength of the motor or motors for one propeller driving unit will reduce the speed of that unit, since the currents in the armatures of the propeller motors remain the same.

Referring more particularly to Fig. 1 of the drawings, 1 designates a main generator having its armature 2 connected in series circuit relation with the armatures 4 and 7 of the port and starboard propeller driving motors 5 and 8, by a circuit extending from the main generator 1 through conductor 3, armature 4, conductor 6, armature 7 and conductor 9 back to the main generator. An exciter 10 of substantially constant voltage type is provided to supply the direct-current excitation to the main generator field winding 11 and the motor field windings 12 and 13, all connected in parallel circuit relation as will be pointed out more clearly hereinafter. The main generator field winding 11 is connected to a potentiometer 14, comprising a resistor 15 and a pair of manually controlled independently operable sliding contact members 16 and 17. The potentiometer is used normally for the control of the motors when their speeds are to be varied simultaneously, and for the reversal of both motors together.

For the independent speed control and the reversal of the respective motors according to our invention, the field winding 12 of the motor 5 is controlled by a potentiometer regulator 18, the field winding of the motor 8 is controlled by a potentiometer 19, and the field winding of the main generator is controlled by a rheostatic regulator 20 normally connected in series with the circuits of the potentiometer 14. The rheostatic regulator 20 is arranged to be operable simultaneously with the operation of the potentiometers 18 or 19. The resistor sections 21 of the potentiometer 18 are connected between a plurality of pairs of contact fingers 22 and 23, the resistor sections 24 of the potentiometer 19 are similarly connected between pairs of contact fingers 25 and 26, and the resistor sections 27 of the rheostatic regulator 20 are connected between pairs of contact fingers 28 and 29 respectively.

One terminal of the motor field winding 12 is connected to the stationary controller-contact-strips 30 and 31 while the other terminal is connected to the stationary controller-contact-strips 32 and 33. The field winding 13 of motor 8 is similarly connected to similar contact-strips 34, 35, 36 and 37. One terminal of the exciter 10, preferably the positive terminal, is connected to the center contact fingers 38 and 39 by the conductors 40, and 41 and 42 of the respective potentiometers 18 and 19. The same or positive terminal of the exciter 10 is also connected, by conductors 40 and 43, to the upper terminal of the resistor 15 of the potentiometer 14. The negative terminal of the exciter, through conductors 44 and 45, is connected to the contact fingers 46', 47' and 48' of the rheostatic regulator 20 and by conductors 44 and 46 to the contact fingers 47, 48, 49 and 50. The lower end of the resistor 15 of potentiometer 14 is connected through conductor 51 to the stationary controller-contact-strip 52.

A movable controller-frame 53 is slidably mounted on guide bar 54. The controller frame may be manually operated on the guide 54 by movement of the handle 55. A pair of controller segments 56 and 57, suitably insulated from each other by the insulating blocks shown, is mounted on the upper arm of the frame 53, and is thus associated with the potentiometer 18. A similar pair of controller segments 58 and 59 is similarly mounted on the lower arm of the frame 53 and is thus associated with the potentiometer 19.

The controller segment 56 is adapted to connect contact fingers 23, including contact finger 48, with the contact-strip 33 or contact fingers 22, including contact finger 47, with contact-strip 30, and the controller segment 57 is adapted to connect the stationary controller-contact-strip 60 either with contact-strip 31 or 32, depending on the position of the frame 53. Since the potentiometer 19 is similarly associated with controller segments 58 and 59, the contact-strip 61 may be connected either with contact-strip 35 or 36, depending on the position of frame 53, and the contact fingers 25, including contact finger 50, may be connected to contact-strip 34 or contact fingers 26, including contact finger 49, may be connected to contact-strip 37. A controller segment 62, mounted on the left-hand arm of the frame 53, is associated with the rheostatic regulator 20. The controller segment 62 is adapted to connect the contact fingers 28 and 29, including the contact fingers 46, 47 and 48, to the contact-strip 52.

All of the controller segments 56, 57, 58, 59 and 62, being mounted on frame 53, are thus arranged to be simultaneously operated. The controller and frame 53 illustrate but one embodiment of a structure to accomplish the novel results hereinafter more specifically specified. Obviously, any other mechanical arrangement may be provided, for example, the contact fingers and contact-strips may be provided on a drum controller or on a disc in arcuate arrangement where the controller segments may be carried on revolving arms and the contact fingers may be disposed in rows of concentric circles about the axis of the moving arms.

Assuming that the frame 53 is in the position shown in Fig. 1, then the field winding 12 is connected to the exciter 10 by a circuit extending from the positive bus or conductor 40, through contact-strip 60, controller segment 57, contact-strips 31 and 30, the field windings 12, contact-strips 32 and 33, controller segment 56, contact finger 48 and conductor 46 to the negative bus or conductor 44. Similarly, the field winding 13 of motor 8 is connected to the exciter 10 by a circuit extending from the positive bus 40 through contact-strips 60 and 61, controller segment 59, contact-strips 35 and 34, field winding 13, contact-strips 36 and 37, controller segment 58, contact finger 49 and conductor 46 to the negative bus 44.

For the position above assumed for frame 53, the controller segment 62 bridges the contact finger 47' and contact-strip 52 thereby shunting all the resistor sections 27. The generator field, for any given position of the slidable contact members 16 and 17 of the potentiometer 14, is thus excited at a maximum and, in consequence, the generator voltage is a maximum. When the slidable contact members are in the position shown, the generator voltage is at its absolute maximum, and by appropriate operation of the slidable members 16 and 17, may be varied from a maximum in one direction through zero to a maximum in the opposite direction. Furthermore, the field excitations of both motors 5 and 8 will be a maximum, since none of the resistor sections 21 and 24 are in the field circuits of the respective motors. It is, of course, obvious that the direction of rotation of motors 5 and 8 is entirely determined by the position of the slidable contact members 16 and 17.

If the frame 53 be moved from the position 0 to the position $x$, the controller segments 62, and 56 and 57 are shifted to the new position, with the result that the voltage across the field windings 12 of the motor 5 is decreased to zero because the windings are completely shunted, but the speed of the motor 5 drops to zero. To compensate for this reduction in counter-electromotive force, all of the resistor sections 27 are inserted in the field circuit of the main generator 1. The field circuit for the field winding 11 may thus be traced from the positive bus 40 through conductor 43, usually a portion of resistor 15, slidable contact member 16, field winding 11, slidable contact member 17, conductor 51, contact-strip 52, controller segment 62, the lowermost contact finger 29', the resistor sections 27 and conductor 45 to the negative bus 44. With all the resistor sections 27 in series with the field winding 11, the voltage of the generator is reduced to half its normal value and the motor 8 thus operates at normal full load speed.

If the controller frame 53 is moved beyond position $x$ toward position $y$, the field connection for motor 5 is reversed because of the fact that controller segment 57 now bridges contact-strips 60 and 32 and controller segment 56 bridges contact-strip 30 and a selected contact finger 22, and successive resistor sections 21 are shunted, thereby increasing the excitation of the motor 5 and increasing the motor speed in reverse direction. To compensate for this change in excitation of the motor 5, successive resistor sections 27 are shunted out of the main generator field winding 11. When the frame 53 is in the position $y$, the generator 1 operates at full voltage, for the setting of contact members 16 and 17, and motor 8 operates in the original direction to drive the propeller 63 at full speed, while motor 5 operates in a reverse direction to drive the propeller 64 at full reverse speed.

During the shifting of controller segments 56, 57 and 62 from the 0 position to the positions $x$ and $y$, respectively, the controller segments 58 and 59 are shifted to positions $x'$ and $y'$, respectively; however, since the distance $0-y'$ equals the distance $0-y$, the speed nor direction of rotation of motor 8 is not affected. As a matter of fact, there would be no need of shifting segments 58 and 59 while the segments 62, 56 and 57 are being shifted, but the mechanism is simplified if all controller segments are permanently connected and the scheme of control is made substantially "fool-proof".

It should be clear from the foregoing description how, when frame 53 is moved in the reverse direction from the position 0, the speed of motor 8 is reduced to zero and reversed whilst the speed and direction of rotation of motor 5 remains unaffected. End contact fingers 48 and 49 are extended by contact-strips 65 and 66, respectively, so that motor 8, as first explained, may not be affected or motor 5, as just now explained, may not be affected.

In order that the field winding 11 of generator 1 may be controlled in the same manner when motor 8 is under control, the contact fingers 29 of rheostatic regulator 20 are duplicated on the opposite side of the illustrated position of the segment 62 and are shown as contact fingers 28, i. e., the contact fingers of regulator 20 are connected together in sets of four.

In the modification shown in Fig. 2, the separate rheostatic field regulator 20 for the main generator 1 is not used, but the potentiometers 18 and 19 are used for this additional purpose. To thus simplify the circuits, one terminal of the exciter 10 (the positive terminal) is connected to the center contact finger 38 of the potentiometer 18 and to the end contact fingers 49 and 50 of potentiometer 19. The other or negative terminal of the exciter is connected to the end contact fingers 47 and 48 of potentiometer 18 and to the center contact finger 39 of potentiometer 19. Since contact-strip 71 extends the full length of potentiometer 19, it will be connected to the positive terminal of the exciter 10 from bus 40 through conductor 41, selected contact fingers 25 or 26 and controller segment 58 for all positions of the manually operable controller frame 53. Similarly, contact-strip 70 will be connected, through conductor or bus 44, conductors 72 or 73, selected contact fingers 22 or 23, to the negative terminal of the exciter for all positions of the contact segments 56 on the controller frame 53. The voltage across contact-strips 70 and 71 will, however, be determined by the number of resistor sections 21 or 24 connected in series circuit relation intermediate the bus 40 and strip 71 and bus 44 and strip 70, respectively. If the varying voltage between contact-strips 70 and 71 be applied directly to the generator potentiometer 14, the generator voltage will be reduced to zero when either motor field was reduced to zero.

One end or terminal of the potentiometer circuit is, therefore, connected to the negatively energized contact-strip 70 through the resistor 74 and the same terminal is connected to the negative terminal of the exciter through resistor 75. The other or lower terminal of the potentiometer 14 is similarly connected to the positively energized contact-strip 71 through resistor 76 while the same terminal is connected to the positive terminal of the exciter through conductor 43 and resistor 77. By varying the ratios between the resistance values of the resistor 75 and the circuit including the resistor 74, and the resistance values of the resistor 77 and the circuit including the resistor 76, any desired weakening of the main generator field 11 may be produced by the operation of the potentiometers 18 and 19. The operation of the arrangement shown in Fig. 2 will be clear from the description given in connection with Fig. 1.

With the arrangements described in connection with Figs. 1 and 2, the motor speeds may be simultaneously controlled by the potentiometer 14, whilst the potentiometers 18 and 19 control the speed and direction of rotation of only one motor at a time. It is thus obvious that any one of the motor units may be used exclusively for the operation of the rudder.

It may in some cases be desirable to be able to control the motors independently whilst the generator controlling devices, such as the potentiometer 14 and the rheostatic regulator 20, remain in the full speed position. In this case, the motor control units are not mechanically coupled and a separate potentiometer for the generator control is coupled to each motor control device. This suggested arrangement is shown in Fig. 3, where the potentiometers 80 and 81 are provided with contact-strips 82 and 83, contact fingers 84 and 85, and 86 and 87, arranged in pairs, and bridging controller segments 88 and 89. The generator potentiometer 14 is connected across the contact-strips 82 and 83 and the center contact fingers 90 and 91 are connected together by conductor 92. The outer or end contact fingers 95 and 96 of potentiometer 80 are connected directly to the negatively energized bus 44 and the end contact fingers 93 and 94 are connected to the positively energized bus 40 through conductors 45 and 97. The potentiometers 80 and 81 are thus in series circuit relation and the voltage applied to the potentiometer 14 will be varied proportionately to and simultaneously with either motor field, being zero when both motor fields are zero.

In the case of two or more motors to each propelling unit, all armatures would be in series, and the motor fields for each group would be treated as one. In the case of two or more generators, the field windings, controlling devices and limiting resistors would be in parallel circuit and the armatures in series circuit.

Although we have shown and described certain specific embodiments of our invention, we are fully aware that many modifications thereof are possible. Our invention, therefore, is not to be restricted except insofar as is necessitated by the prior art and by the scope and spirit of the appended claims.

We claim as our invention:

1. An electric ship-propulsion system including a main separately excited generating station, a plurality of separately excited motors having their armatures connected in series circuit relation to the generating station, means for varying the excitation of the respective motors and means operable simultaneously with the means for varying the excitation of the motors for keeping the load on the main generating station substantially constant during the variations of the excitation of the motors.

2. An electric ship-maneuvering system including a main generator, a plurality of motors connected in series with said main generator, a separate source of direct-current power, field windings for said main generator and said motors, means disposed to connect said field windings to said separate source of direct-current power, a potentiometer circuit for varying the voltage of the main generator from a given positive value to a given negative value, a voltage regulator for further varying the voltage of the main generator, means, independent of each other, but mechanically coupled to said regulator, for simultaneously varying the excitation of the respective motors and the voltage of the generator to keep the load of the generator substantially constant.

3. An electric ship-maneuvering system including a main generator, a plurality of motors connected in series with said main generator, a separate source of direct-current electrical energy, field windings for said main generator and said motors, means disposed to connect said field windings to said separate source of power, a plurality of regulators mechanically coupled to operate simultaneously to automatically vary the voltage of the main generator from a given value to half that value and back to the given value, while the excitation of one motor is varied from a given value of one polarity to zero and to the same value of opposite polarity.

4. An electric ship-propulsion system including main generators, a plurality of motors connected in series with said main generator, a separate source of direct-current energy, field windings for said main generator and said motors, means disposed to connect the field windings to the source of direct-current energy, mechanically coupled regulators for varying the excitation of each motor from a given positive value to a given negative value while the voltage of the main generator is varied from a given value to half that value and back to the given value whereby the load on the main generators is held substantially constant regardless of changes in speed and direction of rotation of said motors.

5. An electric ship propulsion system as claimed in claim 1 in which the field regulator for the field of each motor is also employed to vary the voltage applied to the generator field.

6. An electric ship propulsion system as claimed in claim 1 in which the motor fields and generator field are provided with a single mechanically coupled regulator mechanism for selectively reducing the excitations of the motors to zero and then increasing the excitations in reverse direction simultaneously with reductions and increases, respectively, of the generator field excitation without reversal whereby the generator voltage is reduced and then increased by an amount to correspond to the voltage required by the motors.

JAMES C. WILSON.
HERBERT S. CARNEGIE.